United States Patent
Schmidt et al.

(10) Patent No.: US 10,384,913 B2
(45) Date of Patent: Aug. 20, 2019

(54) THERMAL MANAGEMENT OF LINEAR MOTOR

(71) Applicant: Otis Elevator Company, Farmington, CT (US)

(72) Inventors: Walter Thomas Schmidt, Marlborough, CT (US); Enrico Manes, Feeding Hills, MA (US); Beata I. Wawrzyniak, South Windsor, CT (US); Thomas M. Yun, Glastonbury, CT (US); Shihemn Chen, Northville, MI (US); Jagadeesh Tangudu, South Windsor, CT (US); Zbigniew Piech, Cheshire, CT (US)

(73) Assignee: OTIS ELEVATRO COMPANY, Farmington, CT (US)

( * ) Notice: Subject to any disclaimer, the term of this patent is extended or adjusted under 35 U.S.C. 154(b) by 507 days.

(21) Appl. No.: 15/181,253

(22) Filed: Jun. 13, 2016

(65) Prior Publication Data
US 2017/0355568 A1   Dec. 14, 2017

(51) Int. Cl.
| | |
|---|---|
| H02K 9/02 | (2006.01) |
| B66B 11/04 | (2006.01) |
| F28D 15/02 | (2006.01) |
| H02K 1/12 | (2006.01) |
| H02K 1/34 | (2006.01) |
| H02K 41/03 | (2006.01) |
| H02K 9/22 | (2006.01) |

(52) U.S. Cl.
CPC ......... *B66B 11/0407* (2013.01); *F28D 15/02* (2013.01); *H02K 1/12* (2013.01); *H02K 1/34* (2013.01); *H02K 9/02* (2013.01); *H02K 9/22* (2013.01); *H02K 41/031* (2013.01)

(58) Field of Classification Search
CPC ..... B66B 11/04; B66B 11/0407; F28D 15/02; H02K 1/12; H02K 1/34; H02K 41/03; H02K 9/02; H02K 9/22; H02K 41/031
USPC .................................................. 310/179–210
See application file for complete search history.

(56) References Cited

U.S. PATENT DOCUMENTS

| | | | |
|---|---|---|---|
| 5,158,156 A | 10/1992 | Okuma et al. | |
| 5,234,079 A | 8/1993 | Nomura | |
| 5,501,295 A | 3/1996 | Mueller et al. | |
| 5,571,076 A | 11/1996 | Cooper | |
| 5,668,421 A | 9/1997 | Gladish | |
| 5,751,076 A | 5/1998 | Zhou | |
| 6,140,734 A * | 10/2000 | Hazelton ............ | H02K 3/04 310/12.21 |
| 6,313,550 B1 * | 11/2001 | Binnard ............ | H02K 41/031 310/12.21 |
| 6,513,627 B1 * | 2/2003 | Cruise ................ | B66B 15/08 187/258 |
| 7,019,421 B1 | 3/2006 | Hall et al. | |
| 7,261,186 B2 | 8/2007 | Deplazes et al. | |

(Continued)

FOREIGN PATENT DOCUMENTS

GB   2281664 A   3/1995

*Primary Examiner* — Naishadh N Desai
(74) *Attorney, Agent, or Firm* — Cantor Colburn LLP (57) ABSTRACT

The present disclosure relates generally to a propulsion system for an elevator having a first motor portion mounted to one of an object to be moved and a stationary structure and a second motor portion mounted to the other of the object to be moved and the stationary structure, the first motor portion having at least one coil.

20 Claims, 9 Drawing Sheets

(56) References Cited

U.S. PATENT DOCUMENTS

| | | |
|---|---|---|
| 8,502,421 B2 | 8/2013 | Markon et al. |
| 9,281,735 B2 | 3/2016 | Gandhi et al. |
| 2003/0193256 A1* | 10/2003 | Liebermann .............. H02K 3/24 |
| | | 310/194 |
| 2010/0288586 A1* | 11/2010 | Gorbounov ......... B66B 11/0438 |
| | | 187/250 |
| 2012/0112577 A1* | 5/2012 | Strbuncelj ........... B66B 11/0438 |
| | | 310/63 |
| 2014/0368062 A1 | 12/2014 | Loeser et al. |
| 2015/0307325 A1 | 10/2015 | Fargo |
| 2016/0083225 A1 | 3/2016 | Piech et al. |
| 2016/0083226 A1 | 3/2016 | Piech et al. |
| 2016/0090275 A1 | 3/2016 | Piech et al. |

\* cited by examiner

THERMAL MANAGEMENT OF LINEAR MOTOR

TECHNICAL FIELD OF THE DISCLOSED EMBODIMENTS

The present disclosure is generally related to linear motors and, more particularly, to thermal management of a linear motor.

BACKGROUND OF THE DISCLOSED EMBODIMENTS

Some machines, such as elevator systems, include a propulsion system having one or more linear motors to propel, for example, an elevator car in a hoistway. The linear motor may include a stationary or primary motor portion having coils or windings and a moving or secondary motor portion having one or more permanent magnets. Electrical current is provided to the primary motor portion to permit movement of the secondary motor portion within a hoistway. The primary and secondary motor portions are separated by a gap having a width sufficient to prevent contact between the two motor portions. However, the primary motor portion may experience significant thermal loads during operation, especially during peak usage such as morning and afternoon commute times in an elevator system. Thermal loads are typically significantly higher at locations having higher duty cycles and lower speeds, such as a lobby level or top floor in an elevator system.

Therefore, a need exists for a propulsion system for an elevator to reduce thermal loading on the linear motor and increase efficiency of the linear motor during operation.

SUMMARY OF THE DISCLOSED EMBODIMENTS

In an embodiment of the present disclosure, an elevator system is provided having a hoistway, an elevator car to travel in the hoistway, a first motor portion mounted to one of the elevator car and the hoistway, the first motor portion having at least one coil, and a second motor portion mounted to the other of the elevator car and the hoistway. The second motor portion has at least one permanent magnet. The first motor portion includes a cooling member to allow heat removal from the at least one coil of the first motor portion.

The cooling member may be a heat exchanger disposed between two coils of the first motor portion. The heat exchanger may include at least one of a heat tube, a vapor chamber heat pipe, a liquid fluid circuit, and a gas fluid circuit. The heat exchanger may include a phase change material. The heat exchanger may include a material having a thermal conductivity higher than a thermal conductivity of the at least one coil. The first motor portion may have a first width at a first location and a second width at a second location. The heat exchanger may be disposed at the second location such that the second width is greater than the first width. The first motor portion may be mounted to the hoistway. The first location may be at least one of a lower portion of the hoistway. The second location may be a central portion of the hoistway. The elevator system may further include at least one sheet disposed on at least one face of the first motor portion. The cooling member may be formed as part of the at least one sheet as a plurality of openings through the at least one sheet to allow heat removal from the at least one coil of the first motor portion. The elevator system may further include a coil plug disposed at least partially inside of the at least one coil. The cooling member may be formed as part of the coil plug. The cooling member may include a material having a higher thermal conductivity than the at least one coil. The cooling member may include a plurality of openings extending through the coil plug.

In an embodiment, a propulsion system is provided including a moving motor portion configured to be fixed to an object to be moved, and a stationary motor portion having at least one coil and configured to be fixed to a stationary structure. The moving motor portion and the stationary motor portion are configured to coact to control the movement of the moving motor portion relative to the stationary motor portion. The stationary motor portion includes a cooling member to allow heat removal from the at least one coil of the stationary motor portion.

The cooling member may be a heat exchanger disposed between two coils of the stationary motor portion. The heat exchanger may include at least one of a heat tube, a vapor chamber heat pipe, a liquid fluid circuit, and a gas fluid circuit. The heat exchanger may include a phase change material. The heat exchanger may include a material having a thermal conductivity higher than a thermal conductivity of the at least one coil. The propulsion system may further include at least one sheet disposed on at least one face of the stationary motor portion. The cooling member may be formed as part of the at least one sheet as a plurality of openings through the at least one sheet to allow heat removal from the at least one coil of the stationary motor portion. The propulsion system may further include a coil plug disposed at least partially inside of the at least one coil. The cooling member may be formed as part of the coil plug. The cooling member may include a material having a higher thermal conductivity than the at least one coil. The cooling member may include a plurality of openings extending through the coil plug.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
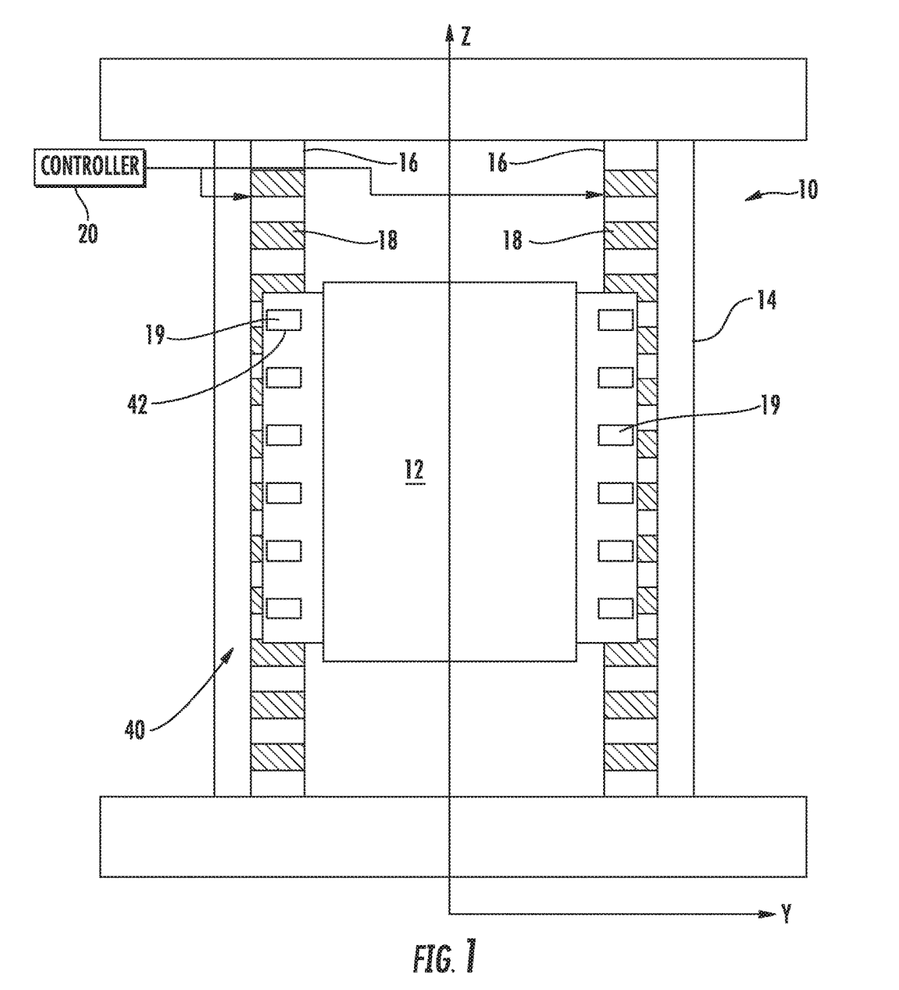
FIG. 1 is a schematic side view of a propulsion system having a linear motor.

FIG. 1 depicts a propulsion system for an exemplary elevator system 10 having an elevator car 12. While an elevator system is depicted, it should be understood that the present disclosure may be applied to any linear motor system, including but not limited to a linear motor system for a railcar, automobile, roller coaster, tram, etc. In the exemplary elevator system, the elevator car 12 or object to be moved travels in a hoistway 14 or other stationary structure. The elevator car 12 is guided by one or more guide rails 16 extending along the length of hoistway 14 or other stationary structure. Exemplary elevator system 10 employs a permanent magnet synchronous linear motor 40 having a first motor portion 18 and a second motor portion 42. The first motor portion 18 is a stator or stationary motor portion having one or more coils or phase windings. The first motor portion 18 may be mounted to guide rail 16, incorporated into the guide rail 16, or may be located apart from guide rail 16. The first motor portion 18 serves as one portion of the permanent magnet synchronous linear motor 40 to impart motion to the elevator car 12 or object to be moved. Permanent magnets 19 are mounted to the car 12 or object to be moved to provide the second motor portion 42 or moving motor portion of the permanent magnet synchronous linear motor 40. Coils or windings of the first motor portion 18 may be arranged in three phases, as is known in the electric motor art. Two first motor portions 18 may be positioned in the hoistway 14 to coact with the permanent magnets 19 of the second motor portion 42 mounted to the elevator car 12 or object to be moved. The permanent magnets 19 may be positioned on two sides of the elevator car 12 or object to be moved, as shown in FIG. 1. In an embodiment, the first motor portion 18 is mounted to the elevator car 12 or object to be moved, and the second motor portion 42 is mounted to the hoistway 14 or other stationary structure. Alternate embodiments may use a single first motor portion 18/second motor portion 42 configuration or multiple first motor portion 18/second motor portion 42 configurations, or any other known type of linear motor.

In an embodiment, the controller 20 provides drive signals to the first motor portion 18 to control motion of the elevator car 12. The controller 20 may be implemented using a general-purpose microprocessor executing a computer program stored on a storage medium to perform the operations described herein. Alternatively, controller 20 may be implemented in hardware, such as an application-specific integrated circuit (ASIC) or a field-programmable gate array (FPGA) in two non-limiting examples, or in a combination of hardware/software. Controller 20 may also be part of an elevator control system. Controller 20 may include power circuitry, including such non-limiting examples as an inverter or drive, to power the first motor portion 18.

Figure 2:
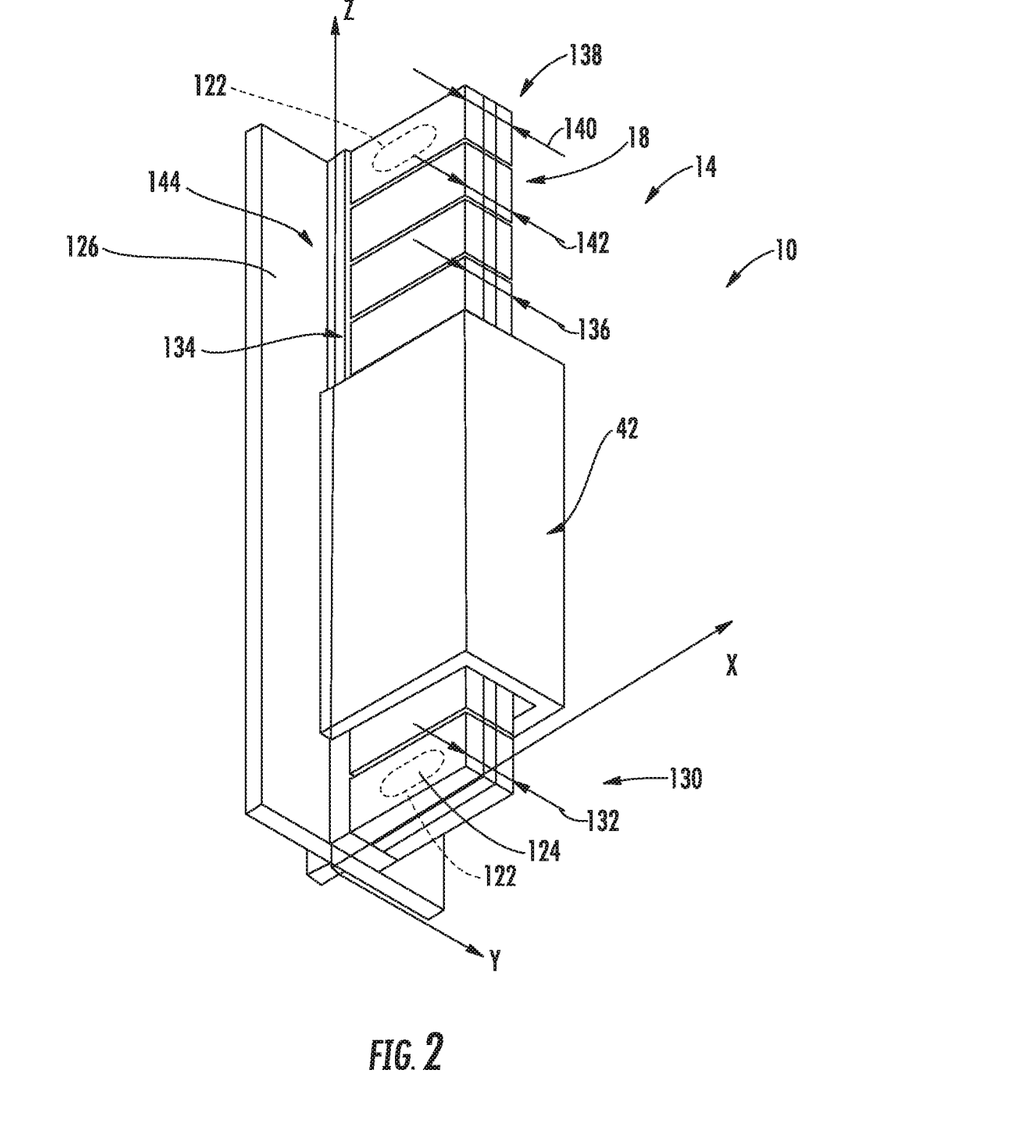
FIG. 2 is a perspective view of a propulsion system having a linear motor according to an embodiment of the present disclosure.

FIG. 2 is a perspective view of the first motor portion 18 and the second motor portion 42 of the exemplary elevator system 10 of FIG. 1 according to one embodiment. The first motor portion 18 is a stator that includes one or more coils or windings 122 formed about a stator core 124. Although two coils 122, each aligned vertically, are illustrated adjacent each other in each vertical row in FIG. 2, the first motor portion 18 may include only one vertically-aligned coil 122 for each vertical row and may include more than two coils 122 aligned vertically in each vertical row. Further, additional embodiments include the first motor portion 18 having coils 122 aligned horizontally such that each horizontally-aligned coil 122 forms a vertical row of the first motor portion 18. Coils 122 may be arranged in a plurality of phases including, without limitation, three phases. Coils 122 may be formed using electrical conductors such as copper or aluminum wires or tape in one or more non-limiting examples. Using aluminum for coils 122, such as wires or tape in one or more non-limiting examples, reduces the mass of the first motor portion 18 and reduces the cost of installation. First motor portion 18 is mounted to a stationary support 126, which may be a metal member secured to an inner wall of the hoistway 14. Stationary support 126 may also serve as the guide rail 16.

In accordance with an embodiment, coils 122 of the first motor portion 18 have a predetermined width such that a width of the first motor portion 18 is variable based on the vertical location of the coil 122 in the hoistway 14, as indicated by the location along the Z-axis in FIG. 2. At a lower portion 130 of the hoistway 14, the first motor portion 18 may have a first width 132. At a central portion 134 of the hoistway 14, the first motor portion 18 may have a second width 136. At an upper portion 138 of the hoistway 14, the first motor portion 18 may have a third width 140.

The first width 132 is greater than the second width 136 in an embodiment such that the first motor portion 18 has a smaller width at a central portion of the hoistway 14, as will be explained in more detail below. The third width 140 may be equal to the first width 132 or the second width 136. Adjacent coils 122 may not increase significantly in width and may gradually increase or decrease in width to allow gradual transition between coils 122. As one example, at a location 144 between the upper portion 138 and the central portion 134, the first motor portion 18 may have a fourth width 142 that is greater than the second width 136, but less than the third width 140.

Figure 3A:
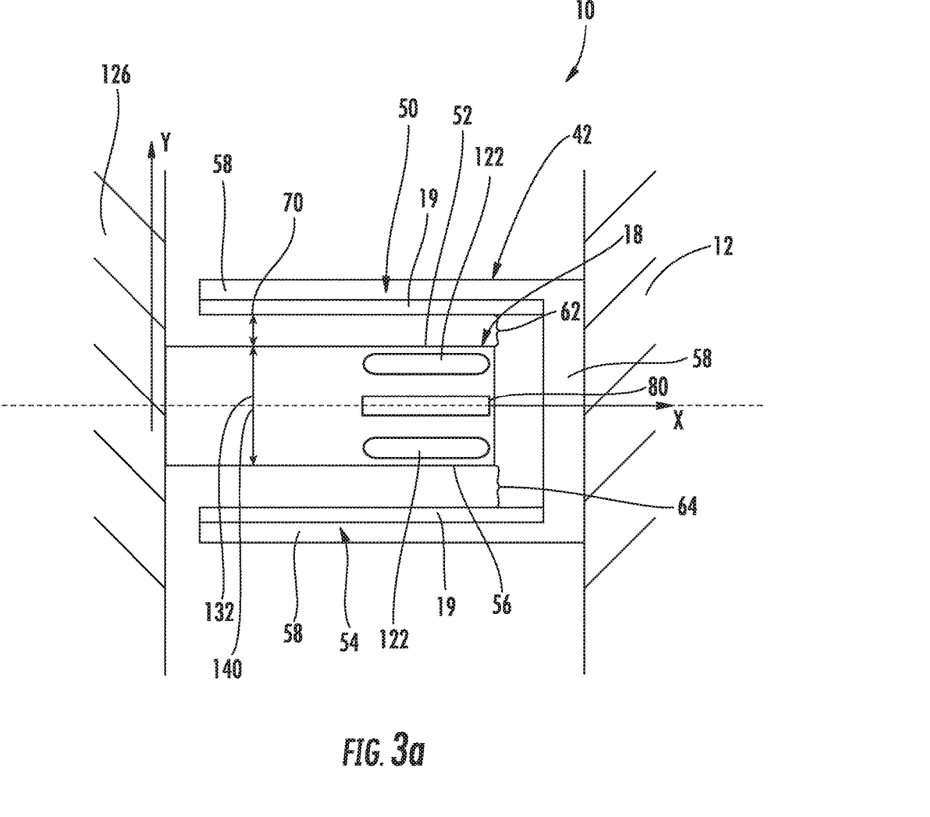
FIG. 3a is a cross-sectional view of a propulsion system having a linear motor according to an embodiment of the present disclosure.
Figure 3B:
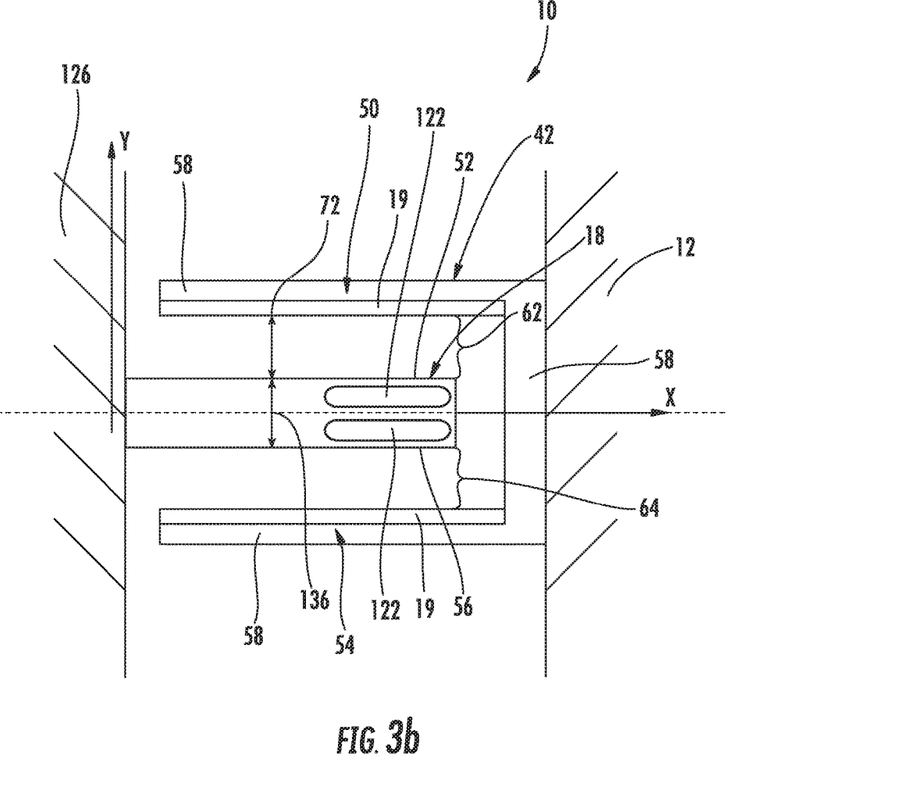
FIG. 3b is a cross-sectional view of a propulsion system having a linear motor according to an embodiment of the present disclosure.
Figure 3C:
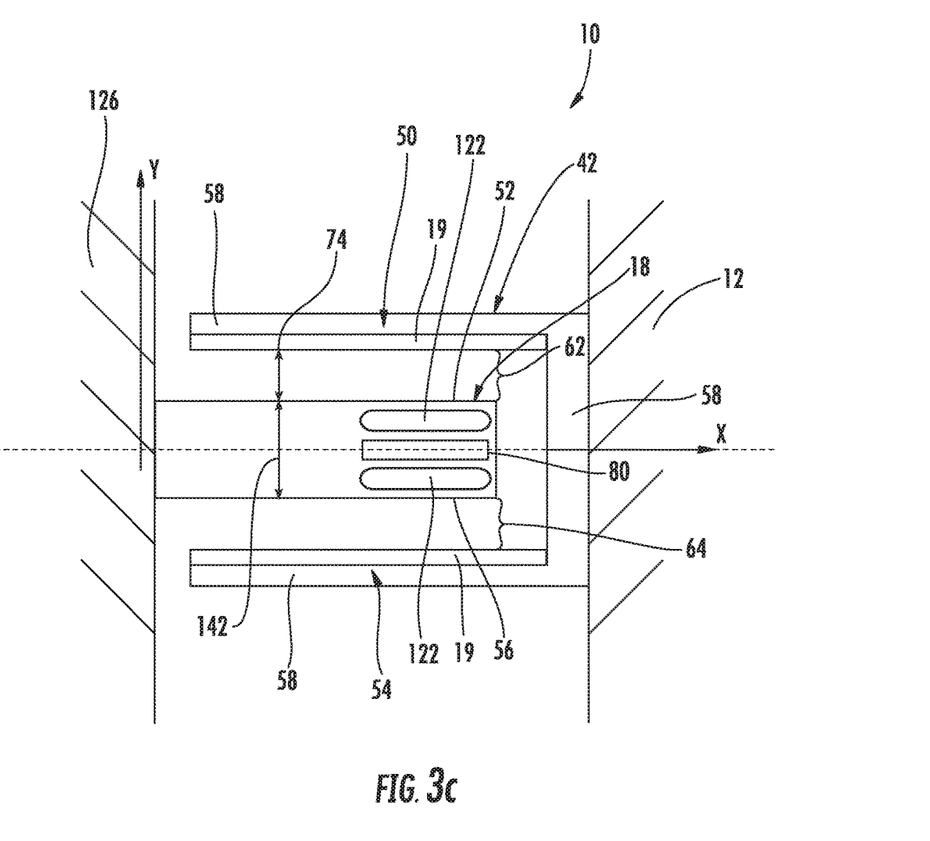
FIG. 3c is a cross-sectional view of a propulsion system having a linear motor according to an embodiment of the present disclosure.

As will be explained in further detail below, at locations such as a lobby or other floor at the lower portion 130 of the hoistway 14 or a top floor at the upper portion 138 of the hoistway 14, a high level of traffic volume and low travel speeds significantly increases the thermal load on an elevator system as compared to other locations, such as express zones at the central portion 134 of the hoistway 14. Therefore, at the lower portion 130 and the upper portion 138 of the hoistway 14, the width of a gap 62 between the first motor portion 18 and the second motor portion 42, illustrated in FIGS. 3a-3c, is relatively small compared to the width of the gap 62 at the central portion 134 to minimize the thermal load at those high traffic/low travel speed locations. In contrast, the gap 62 is maintained as a sufficiently large clearance to prevent contact at the high speed/low traffic locations, such as the central portion 134. In an embodiment, the width of the gap 62 is smaller at some or all landings, as compared to a high speed/low traffic location, such as the central portion 134. In a further embodiment, a lobby or other high traffic location may have the narrowest gap 62, an express zone or other high speed location may have the widest gap 62, and the gaps 62 at one or more intermediate landings or other locations may have one or more widths between the widths of the gaps 62 at the high traffic and high speed locations.

Referring now to FIGS. 3a-3c, cross sectional views of the first motor portion 18 and the second motor portion 42 are shown. As illustrated in FIGS. 2 and 3a-3c, the second motor portion 42 includes the permanent magnets 19 positioned at least partially around the first motor portion 18. A first permanent magnet portion 50 is positioned adjacent to a first side 52 of the first motor portion 18. A second permanent magnet portion 54 is positioned adjacent to a second, typically opposite, side 56 of the first motor portion 18. One or more permanent magnet supports 58 are mounted to the elevator car 12 in the embodiment illustrated in FIGS. 3a-3c. Permanent magnet support 58 may be made from a ferromagnetic material, such as steel in one non-limiting example. To reduce the weight, permanent magnet support 58 may be made of aluminum or another material that is lighter than steel.

Permanent magnet support 58 includes the permanent magnets 19 mounted on the interior surfaces of the first permanent magnet portion 50 and the second permanent magnet portion 54. In additional embodiments, the permanent magnets 19 are embedded in the one or more permanent magnet supports 58. Permanent magnets 19 are positioned to be parallel with the first side 52 and the second side 56 of the first motor portion 18.

At least one gap 62 is formed between the first motor portion 18 and the second motor portion 42. Specifically, a first side gap 62 is defined between the first permanent magnet portion 50 and the first side 52 and a second side gap 64 is defined between the second permanent magnet portion 54 and the second side 56 in the embodiments of FIGS. 3a-3c. In the illustrated embodiment, the first side gap 62 has a distance substantially equal to a distance of the second side gap 64 for each hoistway location. However, in other embodiments, the first side gap 62 has a distance not equal to a distance of the second side gap 64 for one or more hoistway locations. Any reference to gap 62 herein may further describe gap 64 as well in an embodiment, such as those embodiments where the first side gap 62 is substantially equal to the second side gap 64.

Referring specifically to FIG. 3a, the gap 62 includes a first gap distance 70. The first gap distance 70 may relate to the first width 132 of the first motor portion 18 illustrated in FIG. 2 as increasing a width of the first motor portion 18 results in decreasing a distance of the gap 62 in an embodiment. The first gap distance 70 corresponds to a first hoistway location or stationary structure location, including but not limited to the lower portion 130 and/or the upper portion 138 of the hoistway 14 in the illustrated embodiment. The gap 62 of the embodiment illustrated in FIG. 3b includes a second gap distance 72 corresponding to the second width 136 of the first motor portion 18 illustrated in FIG. 2. The second gap distance 72 corresponds to a second hoistway location or stationary structure location, including but not limited to the central portion 134 of the hoistway 14 in the illustrated embodiment. The second gap distance 72 is greater than the first gap distance 70.

In the embodiment illustrated FIG. 3c, the gap 62 includes a third gap distance 74 corresponding to the fourth width 142 of the first motor portion 18 illustrated in FIG. 2. The third gap distance 74 is greater than the first gap distance 70, but less than the second gap distance 72. The third gap distance 74 corresponds to a third hoistway location or stationary structure location, including but not limited to the location 144 between the upper portion 138 and the central portion 134 of the hoistway 14 in the illustrated embodiment.

In one non-limiting example, the first gap distance 70 is between 1.5 and 2 millimeters and the second gap distance 72 is between 3 and 4 millimeters. In one embodiment, the first gap distance 70 may be less than 1.5 or greater than 2 millimeters. In one embodiment, the second gap distance 72 may be less than 3 or greater than 4 millimeters. The third gap distance 74 in the non-limiting example is between 2 and 3 millimeters. In one embodiment, the third gap distance 74 may be less than 2 or greater than 3 millimeters. While the precise gap distances 70, 72, 74 may vary as properly determined by one of ordinary skill in the art, the gap distances 70, 72, 74 are not equal.

The elevator system 10 described herein provides the linear motor 40 with a first, primary motor portion 18 extending vertically in the hoistway 14. The first motor portion 18 has variable widths, such as widths 132, 136, 140, 142, across its vertical length. The variable widths provide for a variation in width of one or more gaps 62 between the first motor portion 18 and the secondary or second motor portion 42.

The gap 62 prevents contact between the first motor portion 18 and the second motor portion 42 due to vibrations of the car 12 as it ascends or descends in the hoistway 14. However, increasing the width of the gap 62 increases the required amount of current provided to the first motor portion 18 to generate thrust, thereby increasing the thermal load on the first motor portion 18. At locations such as a lobby or other floor at the lower portion 130 of the hoistway 14 or a top floor at the upper portion 138 of the hoistway 14, the high level of traffic volume and low travel speeds significantly increase the thermal load as compared to other locations, such as express zones at the central portion 134 of the hoistway 14. Therefore, at the lower portion 130 and the upper portion 138 of the hoistway 14, the width of the gap 62 is relatively small compared to the width of the gap 62 at the central portion 134 to minimize the thermal load at those high traffic/low travel speed locations. In another embodiment, at either the lower portion 130 or the upper portion 138 of the hoistway 14, the width of the gap 62 is relatively small compared to the width of the gap 62 at the central portion 134 to minimize the thermal load at that high traffic/low travel speed location. Lower duty cycles and reduced thermal loading at the central portion 134 allow a wider gap 62 at the central portion 134 to prevent any safety or operational concerns.

The gap 62 of the present embodiments improves the efficiency of the linear motor 40 and reduces the thermal loading on the linear motor 40 while maintaining a large enough clearance to prevent contact between the first motor portion 18 and the second motor portion 42. Especially during times of peak usage, such as morning and afternoon commute times, the gap 62 will improve thermal management of the linear motor 40. However, the various embodiments of the propulsion system utilizing the linear motor 40 disclosed herein are not limited to use with or in an elevator system and may be utilized for horizontal and/or vertical propulsion in other machinery or vehicle systems.

In an embodiment of the present disclosure, the first motor portion 18 includes a cooling member 80 to allow heat removal from the one or more coils 122 of the first motor portion 18. As explained above and illustrated in FIGS. 3a and 3c, the first motor portion 18 may include relatively large widths, such as widths 132, 140, 142, at particular locations across its vertical length to minimize the gap 62, thereby increasing motor efficiency and reducing the thermal load. With the inclusion of the cooling member 80 of one embodiment, greater widths, such as widths 132, 140, 142, of the first motor portion 18 may result, thereby allowing a reduction to the gap 62 and providing additional means for thermal management.

The cooling member 80 may be disposed between two coils 122 of the first motor portion 18, as illustrated in FIGS. 3a and 3c. In further embodiments, one or more cooling members 80 may be disposed adjacent a single or multiple coils 122 of the first motor portion 18. Further, The cooling member 80 may be a heat exchanger in one or more embodiments, including such non-limiting examples as a heat tube, a vapor chamber heat pipe, a liquid or gas fluid circuit, or any other known heat exchange method. In further embodiments, the heat exchanger includes a phase change material or a material having a thermal conductivity higher than a thermal conductivity of any components of the first motor portion 18 or a coil 122 of the first motor portion 18.

In accordance with one or more embodiments, the first motor portion 18 further includes one or more sheets 82 disposed on the first side 52 and/or the second side 56 of the first motor portion 18 to provide structural stiffness for the first motor portion 18 and protect the first motor portion 18 upon contact by the second motor portion 42 or other objects. The sheet 82 is made from non-magnetic stainless steel material in one non-limiting example. The sheet 82 is a composite having a high thermal conductivity in another non-limiting example. The sheet 82 is made from a metal or ceramic having a high thermal conductivity in additional non-limiting examples. With the inclusion of one or more sheets 82, a greater width of the first motor portion 18 at certain locations may result, thereby allowing a reduction to the gap 62 and providing additional means for thermal management in a similar way to the reduction of the gap 62 illustrated in FIGS. 3a-3c and discussed above.

Figure 4:
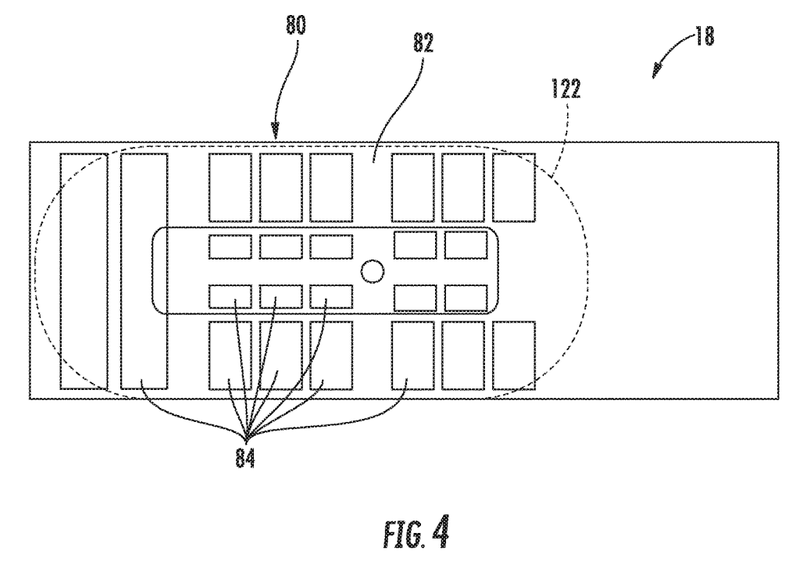
FIG. 4 is an enlarged side view of a linear motor portion having at least one coil according to an embodiment of the present disclosure.
Figure 5:
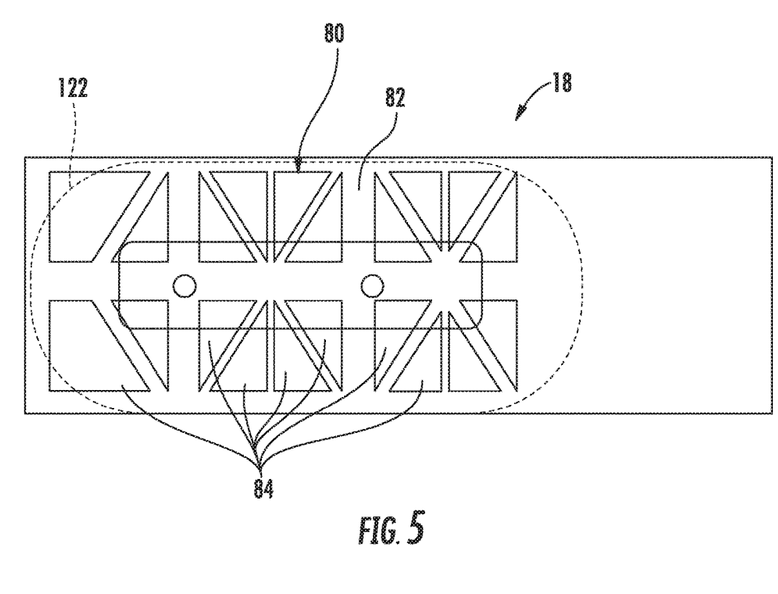
FIG. 5 is an enlarged side view of a linear motor portion having at least one coil according to an embodiment of the present disclosure.

One embodiment of the sheet 82 is illustrated in FIG. 4. A cooling member 80 is formed as part of the sheet 82 as a plurality of openings 84 through the sheet 82 to allow heat removal from one or more coils 122 located adjacent the sheet 82 of the first motor portion 18. In the embodiment illustrated in FIG. 4, the cooling member 80 includes a lattice configuration for the plurality of opening 84. In the embodiment illustrated in FIG. 5, the cooling member 80 includes a truss configuration for the plurality of openings 84. The cooling member 80 featuring a plurality of openings 84 in one or more sheets 82 provides air exposure to the one or more coils 122 to allow heat to be removed from the one or more coils 122 while providing structural stiffness and protection from object impact. The cooling member 80 featuring a plurality of openings 84 in one or more sheets 82 may be included along the entire first motor portion 18 or only at particular locations, such as portions of the hoistway 14 having relatively low motor speeds and/or relatively high duty cycles, as detailed above. As one example, at the lower portion 130 and/or the upper portion 138 of the hoistway 14, the one or more sheets 82 may be provided and have the plurality of openings 84, as compared to the central portion 134, which may not include the one or more sheets 82 or the plurality of openings 84, to minimize the thermal load at those high traffic/low travel speed locations.

Figure 6:
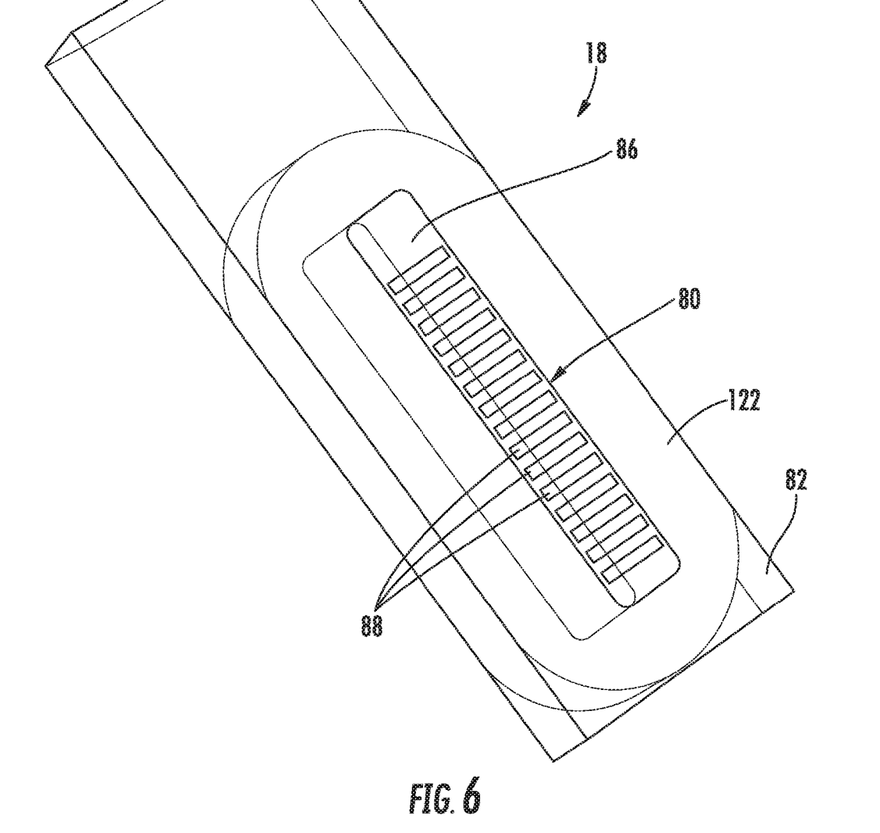
FIG. 6 is an enlarged perspective view of a linear motor portion having at least one coil according to an embodiment of the present disclosure.

Referring now to FIG. 6, one or more embodiments of the present disclosure feature the first motor portion 18 further including a coil plug 86 disposed at least partially inside of the one or more coils 122. The coil plug 86 transmits structural and thermal loads of the one or more coils 122 to the one or more sheets 82 of the first motor portion 18 to provide structural stability to the coils 122. In the embodiment of FIG. 6, the cooling member 80 is formed as part of the coil plug 86. The cooling member 80 and/or the entire coil plug 86 is made from a material having a higher thermal conductivity than a material of the one or more coils 122 or any other part of the first motor portion 18. In one non-limiting example, the cooling member 80 and/or the entire coil plug 86 is made from aluminum or another known highly conductive material. In another non-limiting example, the cooling member 80 and/or the entire coil plug 86 is made from alumina ceramic. The cooling member 80 includes a plurality of openings 88 extending through the coil plug 86 in one embodiment, as illustrated in FIG. 6. The cooling member 80 allows the one or more coils 122 to have closer exposure to air to improve dissipation of heat and thereby improve thermal loading of the first motor portion 18.

Figure 7:
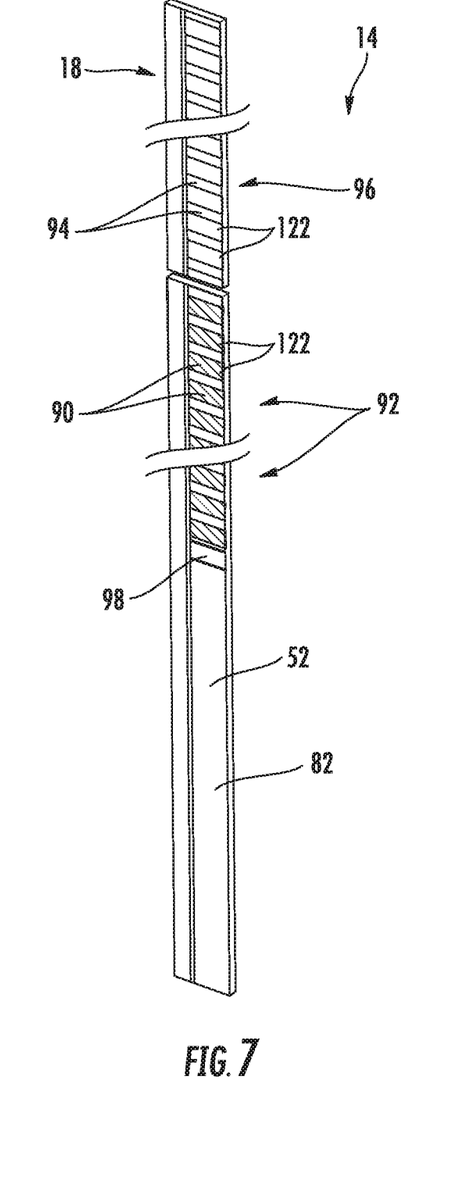
FIG. 7 is a plan view of a linear motor portion having a plurality of coils according to an embodiment of the present disclosure.

Referring now to FIG. 7, an embodiment of the present disclosure includes the first motor portion 18 having one or more first coils 90 at a first location 92 and one or more second coils 94 at a second location 96. The first coil 90 is made from a first material and the second coil 94 is made from a second material. In an embodiment, the first material has a higher electrical and/or thermal conductivity than the second material. The first material is copper and the second material is aluminum in one embodiment. In one embodiment, the first and second materials may be any known electrically or thermally conductive materials.

The first motor portion 18 of the FIG. 7 embodiment is disposed in the hoistway 14. The first location 92 having the first coil 90 experiences a lower motor speed and/or a higher duty cycle than the second location 96 in one embodiment, including without limitation the locations and related traffic, speed, and duty cycles of the embodiments discussed above. As one non-limiting example, the first location 92 experiences a car velocity equal to or less than 1 meter per second and the second location 96 experiences a car velocity greater than 1 meter per second.

The first motor portion 18 of the embodiment of FIG. 7 may further include the one or more sheets 82 disposed on the first side 52 and/or the second side 56 (not shown in FIG. 7) of the first motor portion 18 to provide structural stiffness for the first motor portion 18 and protect the first motor portion 18 upon contact by the second motor portion 42 (not shown in FIG. 7) or other objects. The one or more sheets 82 may be disposed only at the second location 96 in an embodiment. The sheet 82 further includes a ramp portion 98 disposed between the first location 92 and the one or more sheets 82 in another embodiment of the present disclosure to allow a smooth transitional surface from the first location 92 to the one or more sheets 82. The ramp portion 98 in one embodiment is disposed at an end of the sheet 82 and includes a tapered surface to eliminate or reduce one or more sharp edges or corners that might otherwise be present on the one or more sheets 82 adjacent the first location 92. The ramp portion 98 reduces the likelihood that the elevator car 12 or object to be moved would contact an edge of the one or more sheets 82 adjacent the first location 92 as the elevator car 12 or object to be moved travels from the first location 92 toward the one or more sheets 82. Utilizing different materials for the coils 122 of the first motor portion 18 takes advantage of cost reduction for locations that do not experience high traffic or duty cycles. Additionally, the sheets 82 may be selectively placed along the first motor portion 18 to maximize structural stiffness and protection while also improving thermal management.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

What is claimed is:

1. An elevator system comprising:
   a hoistway;
   an elevator car to travel in the hoistway;
   a first motor portion mounted to one of the elevator car and the hoistway, the first motor portion having at least one coil; and
   a second motor portion mounted to the other of the elevator car and the hoistway, the second motor portion having at least one permanent magnet;
   wherein the first motor portion includes a cooling member to allow heat removal from the at least one coil of the first motor portion.

2. The elevator system of claim 1, wherein the cooling member is a heat exchanger disposed between two coils of the first motor portion.

3. The elevator system of claim 2, wherein the heat exchanger includes at least one of a heat tube, a vapor chamber heat pipe, a liquid fluid circuit, and a gas fluid circuit.

4. The elevator system of claim 2, wherein the heat exchanger includes a phase change material.

5. The elevator system of claim 2, wherein the heat exchanger includes a material having a thermal conductivity higher than a thermal conductivity of the at least one coil.

6. An elevator system comprising:
   a hoistway;
   an elevator car to travel in the hoistway;
   a first motor portion mounted to one of the elevator car and the hoistway, the first motor portion having at least one coil; and
   a second motor portion mounted to the other of the elevator car and the hoistway, the second motor portion having at least one permanent magnet;
   wherein the first motor portion includes a cooling member to allow heat removal from the at least one coil of the first motor portion;
   wherein the cooling member is a heat exchanger disposed between two coils of the first motor portion
   wherein the first motor portion has a first width at a first location and a second width at a second location, the heat exchanger being disposed at the second location such that the second width is greater than the first width.

7. The elevator system of claim 6, wherein the first motor portion is mounted to the hoistway, the first location is at least one of a lower portion of the hoistway, and the second location is a central portion of the hoistway.

8. An elevator system comprising:
   a hoistway;
   an elevator car to travel in the hoistway;
   a first motor portion mounted to one of the elevator car and the hoistway, the first motor portion having at least one coil; and
   a second motor portion mounted to the other of the elevator car and the hoistway, the second motor portion having at least one permanent magnet;
   wherein the first motor portion includes a cooling member to allow heat removal from the at least one coil of the first motor portion;
   at least one sheet disposed on at least one face of the first motor portion, wherein the cooling member is formed as part of the at least one sheet as a plurality of openings through the at least one sheet to allow heat removal from the at least one coil of the first motor portion.

9. The elevator system of claim 1, further comprising a coil plug disposed at least partially inside of the at least one coil, wherein the cooling member is formed as part of the coil plug.

10. The elevator system of claim 9, wherein the cooling member comprises a material having a higher thermal conductivity than the at least one coil.

11. The elevator system of claim 9, wherein the cooling member includes a plurality of openings extending through the coil plug.

12. A propulsion system comprising:
    a moving motor portion configured to be fixed to an object to be moved; and
    a stationary motor portion having at least one coil and configured to be fixed to a stationary structure, wherein the moving motor portion and the stationary motor portion are configured to coact to control the movement of the moving motor portion relative to the stationary motor portion;
    wherein the stationary motor portion includes a cooling member to allow heat removal from the at least one coil of the stationary motor portion.

13. The propulsion system of claim 12, wherein the cooling member is a heat exchanger disposed between two coils of the stationary motor portion.

14. The propulsion system of claim 13, wherein the heat exchanger includes at least one of a heat tube, a vapor chamber heat pipe, a liquid fluid circuit, and a gas fluid circuit.

15. The propulsion system of claim 13, wherein the heat exchanger includes a phase change material.

16. The propulsion system of claim 13, wherein the heat exchanger includes a material having a thermal conductivity higher than a thermal conductivity of the at least one coil.

17. A propulsion system comprising:
    a moving motor portion configured to be fixed to an object to be moved; and
    a stationary motor portion having at least one coil and configured to be fixed to a stationary structure, wherein the moving motor portion and the stationary motor portion are configured to coact to control the movement of the moving motor portion relative to the stationary motor portion;
    wherein the stationary motor portion includes a cooling member to allow heat removal from the at least one coil of the stationary motor portion;
    at least one sheet disposed on at least one face of the stationary motor portion, wherein the cooling member is formed as part of the at least one sheet as a plurality of openings through the at least one sheet to allow heat removal from the at least one coil of the stationary motor portion.

18. The propulsion system of claim 12, further comprising a coil plug disposed at least partially inside of the at least one coil, wherein the cooling member is formed as part of the coil plug.

19. The propulsion system of claim 18, wherein the cooling member comprises a material having a higher thermal conductivity than the at least one coil.

20. The propulsion system of claim 18, wherein the cooling member includes a plurality of openings extending through the coil plug.

\* \* \* \* \*

UNITED STATES PATENT AND TRADEMARK OFFICE
CERTIFICATE OF CORRECTION

PATENT NO. : 10,384,913 B2  
APPLICATION NO. : 15/181253  
DATED : August 20, 2019  
INVENTOR(S) : Walter Thomas Schmidt et al.

It is certified that error appears in the above-identified patent and that said Letters Patent is hereby corrected as shown below:

On the Title Page

The correct Assignee name is Otis Elevator Company.

Signed and Sealed this  
Eighth Day of October, 2019

Andrei Iancu  
*Director of the United States Patent and Trademark Office*